United States Patent
Marzban et al.

(10) Patent No.: US 12,041,002 B2
(45) Date of Patent: Jul. 16, 2024

(54) VARIABLE TRACKING REFERENCE SIGNAL DENSITY

(71) Applicant: QUALCOMM Incorporated, San Diego, CA (US)

(72) Inventors: Mohamed Fouad Ahmed Marzban, San Diego, CA (US); Xiaoxia Zhang, San Diego, CA (US); Ahmed Abdelaziz Ibrahim Abdelaziz Zewail, San Diego, CA (US); Zhifei Fan, San Diego, CA (US); Wooseok Nam, San Diego, CA (US); Tao Luo, San Diego, CA (US); Jing Sun, San Diego, CA (US); Qingjiang Tian, San Diego, CA (US); Hemant Saggar, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 17/651,010

(22) Filed: Feb. 14, 2022

(65) Prior Publication Data
US 2022/0321295 A1    Oct. 6, 2022

Related U.S. Application Data

(60) Provisional application No. 63/169,728, filed on Apr. 1, 2021.

(51) Int. Cl.
*H04L 1/00* (2006.01)
*H04L 5/00* (2006.01)
*H04L 27/26* (2006.01)

(52) U.S. Cl.
CPC .......... *H04L 5/0048* (2013.01); *H04L 1/0003* (2013.01); *H04L 1/0009* (2013.01); *H04L 5/0094* (2013.01); *H04L 27/2666* (2013.01)

(58) Field of Classification Search
CPC ................. H04L 1/0003; H04L 1/0009; H04L 27/26025; H04L 27/2613; H04L 27/2657; H04L 27/2662; H04L 27/2666; H04L 5/0048; H04L 5/0094
See application file for complete search history.

(56) References Cited

U.S. PATENT DOCUMENTS

2018/0167946 A1* 6/2018 Si ........................ H04W 72/044

* cited by examiner

*Primary Examiner* — Melvin C Marcelo
*Assistant Examiner* — Natali Pascual Peguero
(74) *Attorney, Agent, or Firm* — Patterson + Sheridan, LLP

(57) ABSTRACT

Certain aspects of the present disclosure provide techniques for receiving an indication of variable tracking reference signal (TRS). A method that may be performed by a user equipment (UE) includes determining a configuration indicating a value for a variable tracking reference signal (TRS) density, monitoring for TRSs from a base station (BS) according to the indicated value for the variable TRS density, and performing at least one of frequency tracking or timing tracking based on the monitoring.

25 Claims, 12 Drawing Sheets

1000

A METHOD FOR WIRELESS COMMUNICATION BY A BASE STATION (BS)

1010

TRANSMITTING A CONFIGURATION TO A USER EQUIPMENT (UE) INDICATING A VALUE FOR A VARIABLE TRACKING REFERENCE SIGNAL (TRS) DENSITY, WHEREIN THE VARIABLE TRS DENSITY IS BASED, AT LEAST IN PART, ON A SYNCHRONIZATION SIGNAL BLOCK (SSB) SUBCARRIER SPACING (SCS) AND A PHYSICAL DOWNLINK SHARED CHANNEL (PDSCH) SCS

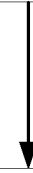

1020

TRANSMITTING TRSs ACCORDING TO THE INDICATED VALUE FOR THE VARIABLE TRS DENSITY

FIG. 10

VARIABLE TRACKING REFERENCE SIGNAL DENSITY

CROSS-REFERENCE TO RELATED APPLICATIONS

This application claims benefit of and priority to U.S. Provisional Application No. 63/169,728, filed Apr. 1, 2021, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for communicating based on a variable tracking reference signal (TRS) density.

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available wireless communication system resources with those users Although wireless communication systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communication systems, increasing the ability for different types of devices to intercommunicate, increasing the number and type of wireless communication mediums available for use, and the like. Consequently, there exists a need for further improvements in wireless communications systems to overcome the aforementioned technical challenges and others.

SUMMARY

Certain aspects can be implemented in a method for wireless communication performed by a base station (BS). The method generally includes transmitting a configuration to a user equipment (UE) indicating a value for a variable tracking reference signal (TRS) density, wherein the variable TRS density is based, at least in part, on a synchronization signal block (SSB) subcarrier spacing (SCS) and a physical downlink shared channel (PDSCH) SCS and transmitting TRSs according to the indicated value for the variable TRS density.

Certain aspects can be implemented in a method for wireless communication performed by a user equipment (UE). The method generally includes determining a configuration indicating a value for a variable tracking reference signal (TRS) density, wherein the variable TRS density is based, at least in part, on a synchronization signal block (SSB) subcarrier spacing (SCS) and a physical downlink shared channel (PDSCH) SCS, monitoring for TRSs from a base station (BS) according to the indicated value for the variable TRS density, and performing at least one of frequency tracking or timing tracking based on the monitoring.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 10 depicts a method for wireless communication.

DETAILED DESCRIPTION

Figure 1:
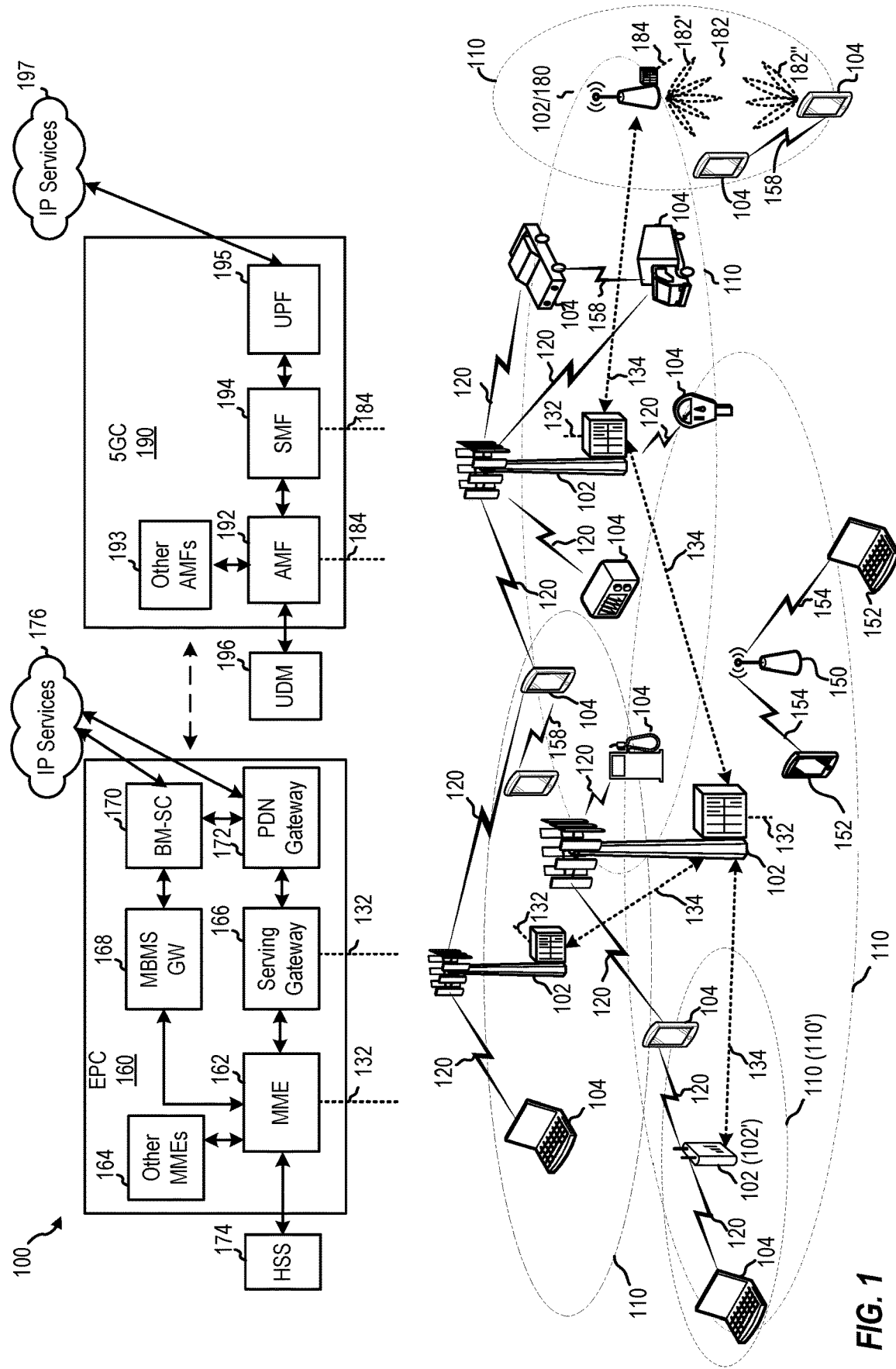
FIG. 1 depicts an example wireless communication network.

Aspects of the present disclosure provide apparatuses, methods, processing systems, and computer-readable mediums for determining a variable tracking reference signal (TRS) density, and transmitting an indication of the variable TRS density to a user equipment (UE).

For example, in certain wireless communication systems, timing and frequency synchronization errors should be minimized between the UE and the BS—otherwise, any transmissions between the BS and the UE may not be received correctly. At the UE, to correct for such timing and frequency errors, the UE may first receive one or more synchronization signal blocks (SSBs), which allow the UE to determine the start of a slot and to coarsely refine any timing and frequency errors. Thereafter, the UE may monitor for and receive one or more TRSs from the BS that allow the UE to further refine the timing and frequency errors. In order for the UE to be able to refine the timing error based on TRS, the timing and frequency error after SSB correction must be within a "pull-in" range of the TRS. The timing pull-in range is based on a density of TRS within a resource block (RB) while the frequency pull-in range depends on the symbol spacing between the TRS symbols. However, in certain cases, even after SSB correction, the timing/frequency error may not be within the timing/frequency pull-in range of the TRS, preventing the UE from correcting the timing/frequency error based on the TRS.

This issue may be based on a ratio between a subcarrier spacing for the SSB and a subcarrier spacing of a physical downlink control channel (PDSCH) (e.g., in which the TRS are transmitted by the BS). For example, when the subcarrier spacing of the PDSCH is greater than the subcarrier spacing of the SSB, the timing pull-in range of the TRS may not be large enough to account for timing errors even after SSB correction at current TRS densities. When the subcarrier spacing of the SSB is greater than the subcarrier spacing of the PDSCH, the frequency pull-in range of the TRS may not be large enough to correct the frequency errors using current symbol spacing.

Therefore, aspects of the present disclosure provide techniques for varying the density and/or symbol spacing of TRSs based on the subcarrier spacing of the SSB and the subcarrier spacing of the PDSCH. By varying the density and/or symbol-spacing of the TRS based on the subcarrier spacing of the SSB and the subcarrier spacing of the PDSCH, the possibility that the timing/frequency error after SSB correction does not fall within the timing/frequency pull-in range of the TRS may be beneficially reduced. Further, reducing the possibility that the timing/frequency error after SSB does not fall within the pull-in range of the TRS may ensure that the UE is able to use TRS to correct the timing error, increasing the chances that the UE successfully receives and decodes signals from the BS and thereby reducing power consumption at the UE and wasted time and frequency resources due to failed decoding.

Introduction to Wireless Communication Networks

The techniques and methods described herein may be used for various wireless communications networks. While aspects may be described herein using terminology commonly associated with 3G, 4G, and/or 5G wireless technologies, aspects of the present disclosure may likewise be applicable to other communication systems and standards not explicitly mentioned herein.

FIG. 1 depicts an example of a wireless communication network 100, in which aspects described herein may be implemented.

Generally, wireless communication network 100 includes various network entities (alternatively, network elements or network nodes), which are generally logical entities associated with, for example, a communication device and/or a communication function associated with a communication device. For example, various functions of a network as well as various devices associated with and interacting with a network may be considered network entities.

In the depicted example, wireless communication network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with UEs 104 via communications links 120. The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

FIG. 1 depicts various example BSs 102, which may more generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communication coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communication coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
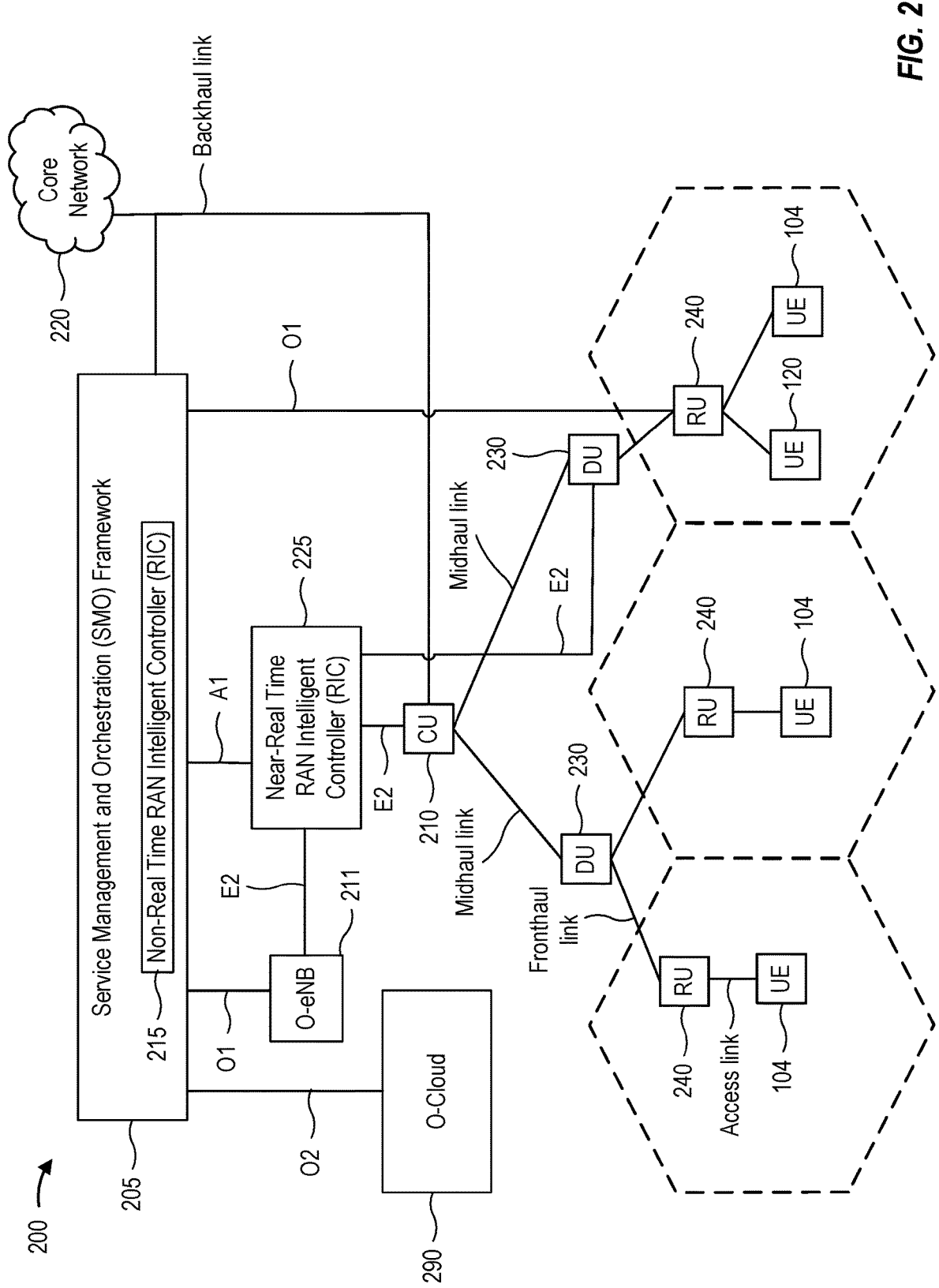
FIG. 2 depicts an example disaggregated base station architecture.

While BSs 102 are depicted in various aspects as unitary communication devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communication network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communication network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communication links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the base station 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communication network 100 further includes a Wi-Fi AP 150 in communication with Wi-Fi stations (STAs) 152 via communication links 154 in, for example, a 2.4 GHz and/or 5 GHz unlicensed frequency spectrum.

Certain UEs 104 may communicate with each other using device-to-device (D2D) communication link 158. D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
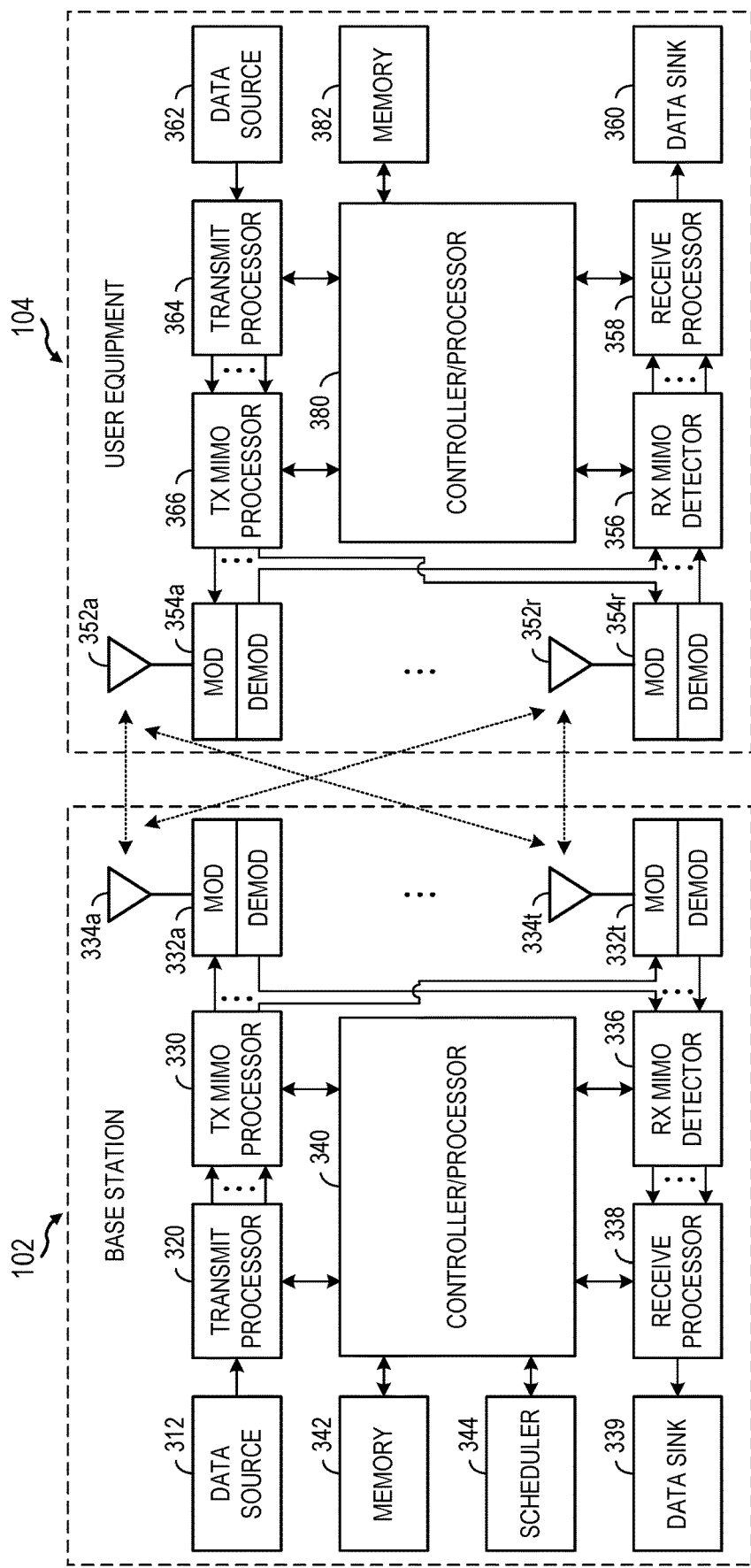
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., data source 362) and wireless reception of data (e.g., data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communication network, such as wireless communication network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communication systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and in the time domain with SC-FDM.

A wireless communication frame structure may be frequency division duplex (FDD), in which for a particular set of subcarriers and subframes within the set of subcarriers are dedicated for either DL or UL. Wireless communication frame structures may also be time division duplex (TDD), in which for a particular set of subcarriers and subframes within the set of subcarriers are dedicated for both DL and UL.

In FIGS. 4A and 4C, the wireless communication frame structure is TDD where D is DL, U is UL, and X is flexible for use between DL/UL. UEs may be configured with the slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include mini-slots, which generally have fewer symbols than an entire slot. Other wireless communication technologies may have a different frame structure and/or different channels.

Generally, the number of slots within a subframe is based on a slot configuration and a numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and slots/subframe. The subcarrier spacing and symbol length/duration are a function of the numerology. The subcarrier spacing may be equal to $2^{\mu} \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 4B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may also transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Variable Tracking Reference Signal Densities

When connecting to and communicating with a wireless communication network, such as the wireless communication network 100, a user equipment (UE) may perform one or more synchronization procedures with the wireless communication to correct for timing errors. These synchronization procedures allow the UE to properly receive transmissions from the wireless communication network.

Figure 4:
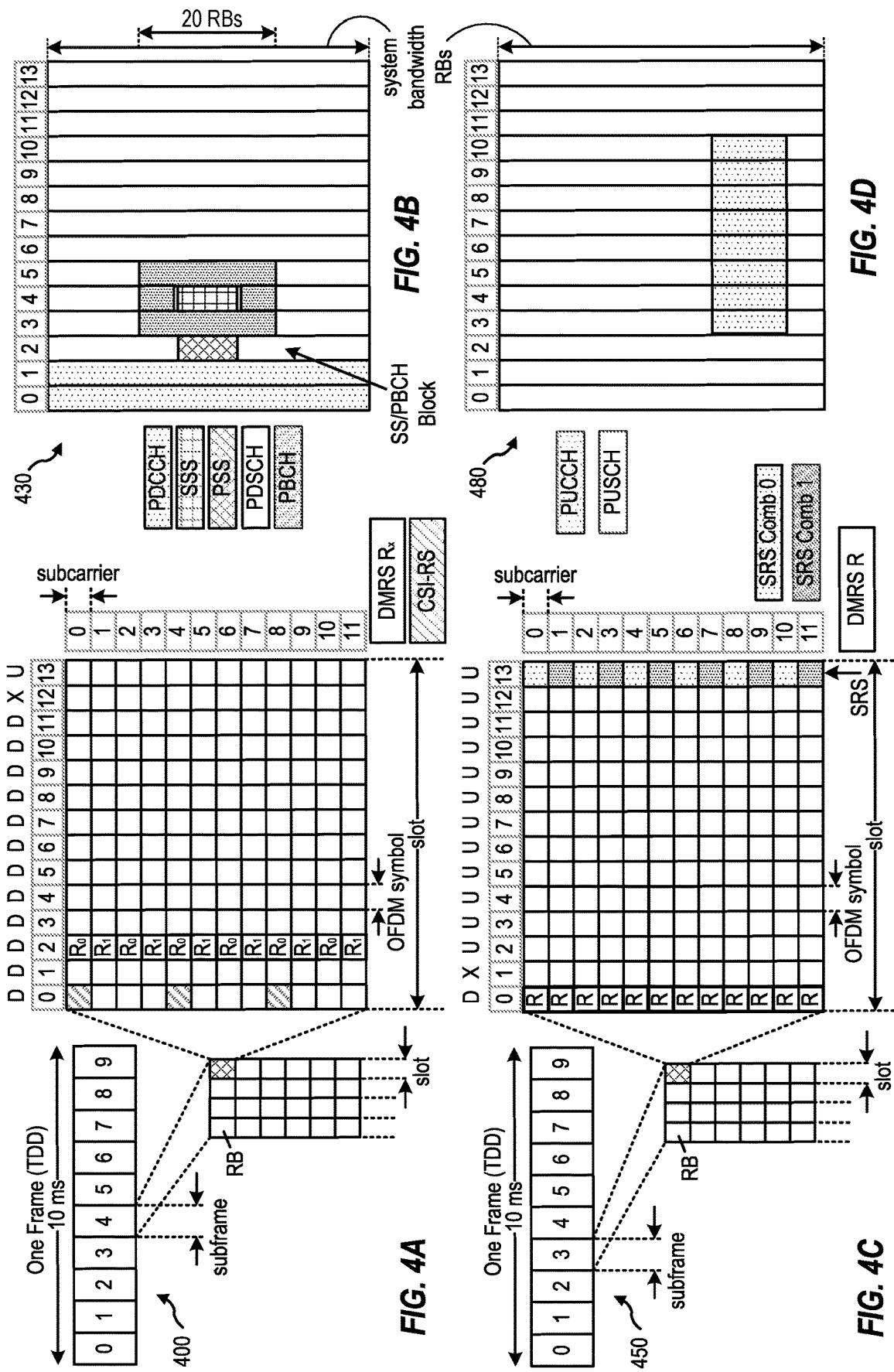
FIGS. 4A, 4B, 4C, and 4D depict various example aspects of data structures for a wireless communication network.
Figure 5:
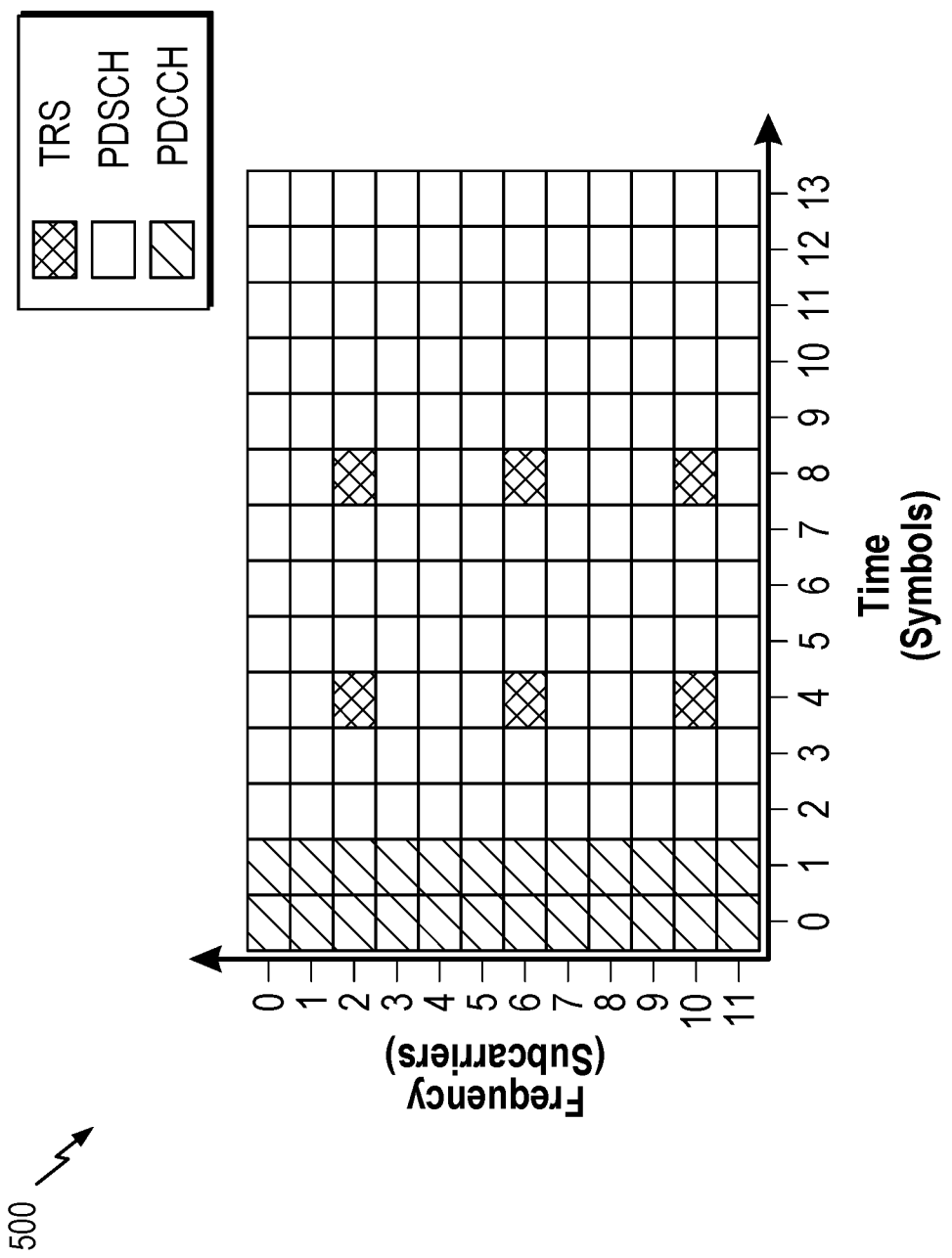
FIG. 5 shows a time-frequency resource grid, illustrating the allocation of resources for TRSs.

In fifth generation (5G) new radio (NR) wireless communication networks, timing error corrections are performed in two steps. A first step includes receiving a synchronization signal block (SSB) that includes a primary synchronization signal (PSS) and a secondary synchronization signal (SSS), for example, as described with respect to FIG. 4B. Here, the SSB may be used for synchronization purposes to determine a coarse timing for a start of a slot. Thereafter, the UE may receive one or more tracking reference signals (TRSs) to refine the timing error and to track a drift in the timing error. SSB-based timing error correction is primarily used during an initial access procedure, while TRS-based timing error correction is used for connected-mode operation. Thus, data reception before radio resource control (RRC) connection (e.g., system information block 1 (SIB1), random access channel (RACH) message 2, RACH message 4, RACH message B, and the like) may not benefit from the TRS-based fine timing error correction FIG. 5 shows a time-frequency resource grid 500, illustrating the allocation of resources for TRSs. As shown, time (in terms of symbols) is depicted along the horizontal axis while frequency (in terms of subcarriers) is depicted along the vertical axis. The time-frequency resource grid 500 illustrated in FIG. 5 may represent one resource block (RB), consisting of 12 subcarriers and one slot (e.g., including 12 to 14 symbols per slot) as described with respect to FIG. 4A. As shown, the time-frequency resource grid 500 includes resources for physical downlink control channel (PDCCH) transmissions, physical downlink shared channel (PDSCH) transmissions, and TRS in this example.

TRSs are a special type of channel state information reference signal (CSI-RS). For example, TRSs may include a resource set of multiple periodic CSI-RS. In typical configurations, TRSs may be transmitted in two adjacent slots and within two symbols within each slot. For example, as illustrated in FIG. 5, TRSs may be transmitted within symbols 4 and 8 of the time-frequency resource grid 500, having a symbol spacing of four ($\Delta n_{TRS}=4$). Further, as depicted, TRSs may have a subcarrier spacing (SCS) of four subcarriers measured from the centers of the TRS REs (e.g., $\Delta k_{TRS}=4$), resulting in a TRS density within a resource block (e.g., that only includes 12 subcarriers) of three resource elements. In other words, as depicted in FIG. 5, due to $\Delta k_{TRS}=4$, three TRS may be transmitted within a resource block.

Additionally, TRSs may have a symbol spacing within a slot ($\Delta n_{TRS}$) of four symbols (e.g., $\Delta n_{TRS}=4$ symbols). In some cases, the symbol positions for the TRSs may be configured by RRC signaling and may be one of several options. For example, as shown in FIG. 5, TRS may be located in symbols 4 and 8. In other cases, TRS may be located in symbols 5 and 9. In yet other cases, TRS may be located in symbols 6 and 10.

Generally, timing errors may be corrected by TRS only if the timing error is within a timing pull-in range of the TRS symbols. The timing pull-in range may be based on an SCS of the PDSCH and specifies the maximum amount of timing error (e.g., typically in microseconds) that may be corrected. In other words, any timing error greater than the timing pull-in range of the TRS may not be able to be corrected by using TRS. As an example, the TRS timing pull-in range may be determined according to Equation 1, below.

$$\text{Timing pull-in range} = +/- \frac{1}{2 \times \Delta k_{TRS} * SCS_{PDSCH}} \quad (1)$$

As shown in Equation 1, $\Delta k_{TRS}$ is the subcarrier spacing of the TRS and $SCS_{PDSCH}$ is the subcarrier spacing of the PDSCH. In legacy systems that use a subcarrier spacing of $\Delta k_{TRS}=4$, Equation 1 may be simplified, as follows, in Equation 2.

$$\text{Timing pull-in range} = +/- \frac{1}{8 * SCS_{PDSCH}} \quad (2)$$

In some cases, whether a timing error is within the timing pull-in range of the TRS, and thus correctable by the TRS, may depend on the magnitude of the timing error after SSB timing correction has been performed. In other words, whether the timing error is within the timing pull-in range of the TRS may depend on an SSB configuration. For example, in current SSB configurations, the synchronization signals of an SSB may consist of 127 subcarriers ($k_{SSB}=127$) and have a granularity ($g_{SSB}$) or resolution determined according to Equation 3, below.

$$g_{SSB} = \frac{1}{BW_{SSB}} = \frac{1}{k_{SSB} \times SCS_{SSB}} \quad (3)$$

As depicted, $BW_{SSB}$ is a bandwidth associated with the SSBs and may be based on the number of subcarriers (e.g., $k_{SSB}$) and a subcarrier spacing of the SSBs ($SCS_{SSB}$). In some cases, the granularity of SSBs may be enhanced using 2× oversampling, which is represented, below, in Equation 4.

$$g_{SSB} = \frac{1}{2k_{SSB} \times SCS_{SSB}} \quad (4)$$

Accordingly, as an example, assuming the number of subcarriers associated with the SSBs is 127 subcarriers and a subcarrier spacing of 120 kHz, the SSB granularity may be approximately 32.81 nanoseconds (ns), as shown below in Equation 5.

$$g_{SSB} = \frac{1}{2(127) \times 120} = 32.81 \text{ ns} \quad (5)$$

In the example shown in Equation 5, the SSB granularity of 32.81 ns may represent the minimum amount of timing error that may be corrected. Accordingly, as can be seen, as the SSB subcarrier spacing increases, the SSB granularity, or minimum amount of timing error that can be corrected, decreases. Typically, it is better to have lower SSB granularities as this would allow the SSBs to correct for more minute timing errors.

In some cases, the amount of timing error that can be corrected using the SSB may be determined in different manners. A first manner may be based on a number of samples, n. For example, in such cases, assuming that SSBs may reduce the timing error down to six samples (n=6 samples), the timing error after SSB correction may be within the range of $n \times g_{SSB}=196.86$ ns.

Another manner for determining the amount of timing error that SSBs are able to correct may be based on a cyclic prefix associated with the SSBs ($CP_{SSB}$). For example, the SSBs may typically reduce the timing error down to $$\pm \frac{CP_{SSB}}{2}.$$

In such cases, assuming a subcarrier spacing of 120 kHz ($SCS_{SSB}$=120 kHz) and a cyclic prefix of 585.94 ns ($CP_{SSB}$=585.94 ns), the timing error after SSB correction may be within the range of 292.97 ns. For example, a symbol time of each of the SSB symbols (without CP) may be equal to $$\frac{1}{SCS_{SSB}}.$$

Typically, the CP occupies 0.0703125 of the symbol time. Hence, for $SCS_{SSB}$=120 kHz, $$CP \text{ duration} = 0.0703125 \times \frac{1}{120000} = 585.94 \text{ ns}.$$

In some cases, an additional safety margin may be required to account for timing errors due to noise. For example, as noise increases, the timing error correction algorithm based on SSBs may not be able to reduce the timing errors to 6 samples or $$\pm \frac{CP_{SSB}}{2}.$$

The timing error correction algorithm may be able to reduce the timing errors to 7 or 8 samples or a little bit more than $$\pm \frac{CP_{SSB}}{2}.$$

Thus, an additional safety margin may be needed to ensure the timing pull-in range of the TRS can correct a little bit more than $$\pm \frac{CP_{SSB}}{2}$$

or 6 samples.

Accordingly, given that the timing error may be reduced by SSB correction by only a certain amount as shown above, it may be necessary to ensure that the timing error after SSB correction can be further corrected by TRS. Stated otherwise, it may be desirable to ensure that the timing error after SSB correction falls within the timing pull-in range of the TRS so that the timing error may be corrected by the TRS. However, due to current SCS requirements for SSB and PDSCH, there may be scenarios where such timing error may not fall within the timing pull-in range of TRS.

For example, in 5G NR, a relatively low SCS may be used for SSB to maintain high coverage while a relatively high PDSCH SCS may be used to meet throughput requirements. The ratio between the SCS of the SSB and the SCS of the PDSCH is greater in frequency band FR2x (52.6 GHz-71 GHz) compared with sub-6 and mmWave bands. For example, SSB SCS could be as low as 120 kHz while PDSCH SCS could reach as high as 960 kHz. Depending on the SSB and PDSCH subcarrier spacings (e.g., numerologies), the timing errors after SSB correction cannot be guaranteed to fall within the timing pull-in range of the TRS.

For example, assuming a SSB subcarrier spacing of $SCS_{SSB}$=120 kHz and a PDSCH subcarrier spacing of $SCS_{PDSCH}$=960 kHz, the timing error after SSB correction may be within the range of ±196.86 ns, which, in some cases, could even be higher due to noise. Further, at $SCS_{PDSCH}$ of 960 kHz, the timing pull-in range of TRS is ±130 ns. Here, because the timing error after SSB correction is higher than the timing pull-in range of the TRS in this numerology scenario, the TRS will not be able to correct the timing error after SSB correction. Consequently, the UE may not be able to decode received signals from the BS due to the residual timing error that cannot be corrected by the TRSs.

Therefore, aspects of the present disclosure provide techniques for improving the probability that the timing error after SSB correction falls within the timing pull-in range of the TRS so that further timing correction is possible utilizing the TRS. For example, aspects of the present disclosure provide techniques for varying the density of TRS based on the subcarrier spacing of the SSB and the subcarrier spacing of the PDSCH. For example, in the example presented above where $SCS_{SSB}$=120 kHz and $SCS_{PDSCH}$=960 kHz, increasing the TRS density (e.g., number of TRS REs per RB), or decreasing the subcarrier spacing $\Delta k_{TRS}$, may increase the timing pull-in range of the TRS, allowing for larger timing errors after SSB correction to be corrected by TRS. Thus, the subcarrier spacing of TRS $\Delta k_{TRS}$ may directly affect the timing pull-in range of TRS and the amount of timing error correctable by TRS.

Figure 6:
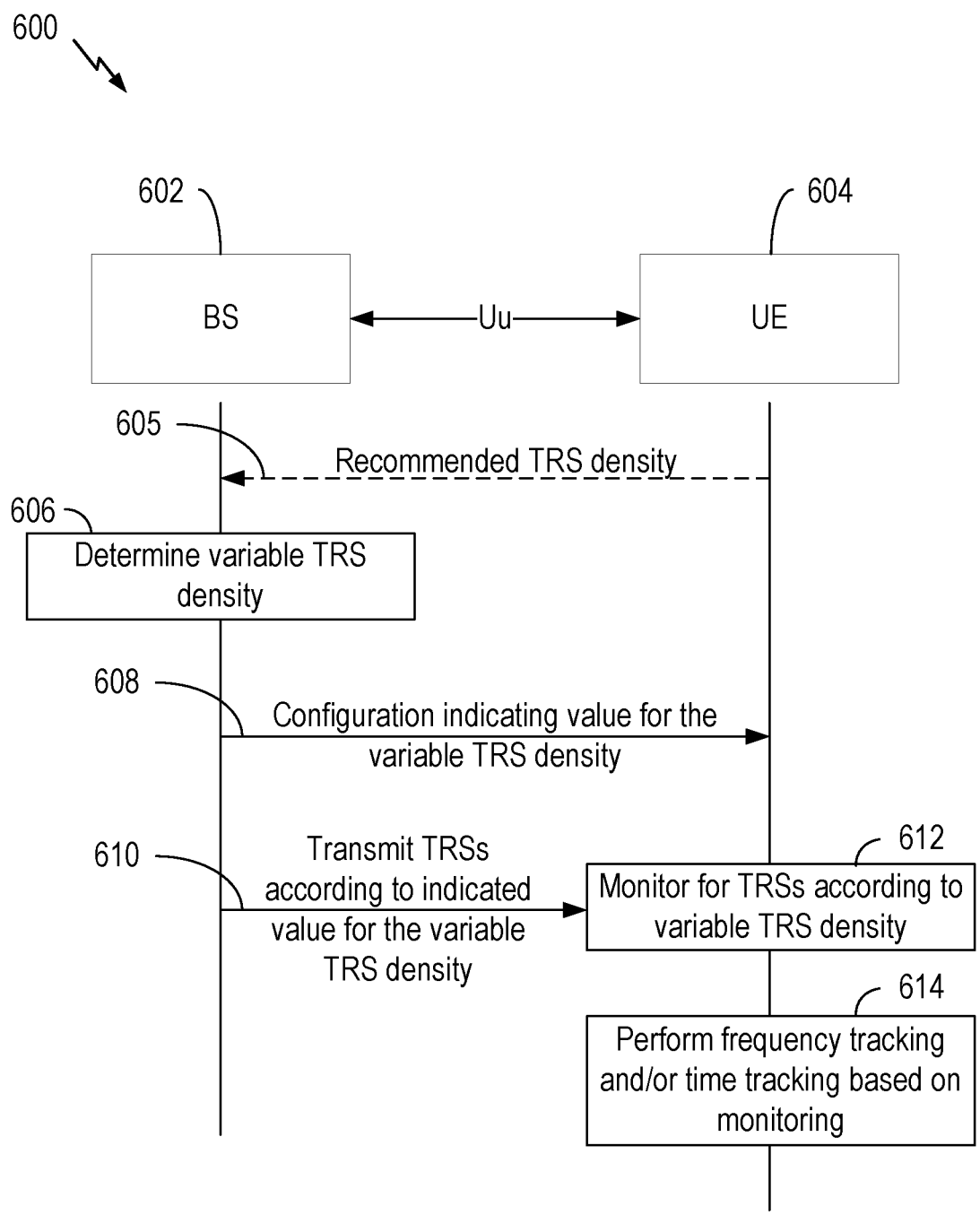
FIG. 6 is a call flow diagram illustrating example operations between a base station and a user equipment for transmitting and receiving an indication of a variable tracking reference signal density.

Example Operations of Entities in a Communication Network for Using a Variable TRS Density FIG. 6 depicts a process flow illustrating operations 600 for communication in a network between a base station (BS) 602 and a user equipment (UE) 604, for example, for determining and communicating based on a variable TRS density. In some aspects, the BS 602 may be an example of the BS 102 depicted and described with respect to FIGS. 1 and 3. Similarly, the UE 604 may be an example of UE 104 depicted and described with respect to FIGS. 1 and 3. However, in other aspects, UE 604 may be another type of wireless communication device and BS 602 may be another type of network entity or network node, such as those described herein.

As shown, the operations 600 illustrated in FIG. 6 begin at 606 with the BS 602 determining a configuration for a user equipment (UE), indicating a value for a variable TRS density. In some cases, the BS 602 may determine the variable TRS density based, at least in part, on an SSB SCS and a PDSCH SCS.

For example, to help ensure that the timing error after SSB correction is within the TRS timing pull-in range (e.g., and therefore correctable by the TRS), the TRS timing pull-in range should be greater than or equal to the timing error after SSB correction. Further, because the TRS density (e.g., subcarrier spacing of TRS, $\Delta k_{TRS}$) directly affects the TRS timing pull-in range, in some cases, the BS 602 may determine a variable TRS density in block 606 (e.g., represented by the TRS SCS, $\Delta k_{TRS}$) such that the resulting TRS timing pull-in range is greater than the timing error after SSB correction, as described below. Accordingly, as the timing error after SSB correction is based on the subcarrier spacing of SSB ($SCS_{SSB}$) and the TRS timing pull-in range is based on the subcarrier spacing of PDSCH ($SCS_{PDSCH}$) the BS 602 may make the determination of the variable TRS density (e.g., $\Delta k_{TRS}$) in block 606, based on a ratio between $SCS_{SSB}$ and $SCS_{PDSCH}$ according to Equation 6, below.

$$\frac{1}{2 \times \Delta k_{TRS} \times SCS_{PDSCH}} \geq n \times \frac{1}{k_{SSB} \times SCS_{SSB}} \qquad (6)$$

As shown above, the expression to the left of the inequality in Equation 6 represents the TRS timing pull-in range while the expression to the right of the inequality represents the timing error after SSB correction (e.g., $n \times g_{SSB}$). Equation 6 may be simplified in terms of $\Delta k_{TRS}$ as shown below in Equation 7.

$$\Delta k_{TRS} \leq \left\lfloor \frac{k_{SSB}}{n} \times \frac{SCS_{SSB}}{SCS_{PDSCH}} \right\rfloor + \beta \qquad (7)$$

As can be seen, $\Delta k_{TRS}$ (e.g., the TRS density) is based, at least in part, on the ratio between $SCS_{SSB}$ and $SCS_{PDSCH}$. Additionally, $\lfloor \ldots \rfloor$ in Equation 7 is a floor operation, and the variable $\beta$ is added to account for noise. In some cases, $\beta$ is greater than or equal to zero (e.g., $\beta \geq 0$) and may be set by the BS 602 according to a signal to noise ratio (SNR) of a communication channel used by the BS 602. An example of using Equation 7 to determine the TRS density is presented below in Equation 8.

$$\Delta k_{TRS} \leq \left\lfloor \frac{127}{6} \times \frac{120}{960} \right\rfloor + 0 \leq 2 \qquad (8)$$

As shown above, Equation 8 assumes a SSB subcarrier spacing of $SCS_{SSB}=120$ kHz, a PDSCH subcarrier spacing of $SCS_{PDSCH}=960$ kHz, SSB consisting of $k_{SSB}=127$ subcarriers, SSB is able to correct a timing error down to n=6 chips, and $\beta=0$ (e.g., no noise). Accordingly, under these assumptions, the TRS subcarrier spacing in Equation 8 is $\Delta k_{TRS}=2$, resulting in a TRS density of six REs per TRS.

Further, assuming the same values of the parameters shown in Equation 8 (e.g., n=6, $SCS_{SSB}=120$ kHz, and $k_{SSB}=127$ subcarriers), the timing error after SSB correction would be 196.86 ns (e.g., using Equation 5 to determine $g_{SSB}$ and multiplying by n). Accordingly, when TRS density is six REs per TRS (e.g., $\Delta k_{TRS}=2$), the TRS timing pull-in range is 260.42 ns, which is greater than the timing error of 196.86 ns after SSB correction. Thus, in this example, because the timing error after SSB correction (e.g., 196.86 ns) falls within the TRS timing pull-in range of 260.42 ns, TRS will be able to correct the residual timing error after SSB correction. Further, in some cases, to account timing error due to added noise, the TRS density may further be increased to 12 REs per TRS or a TRS subcarrier spacing of one subcarrier ($\Delta k_{TRS}=1$).

Figure 7A:
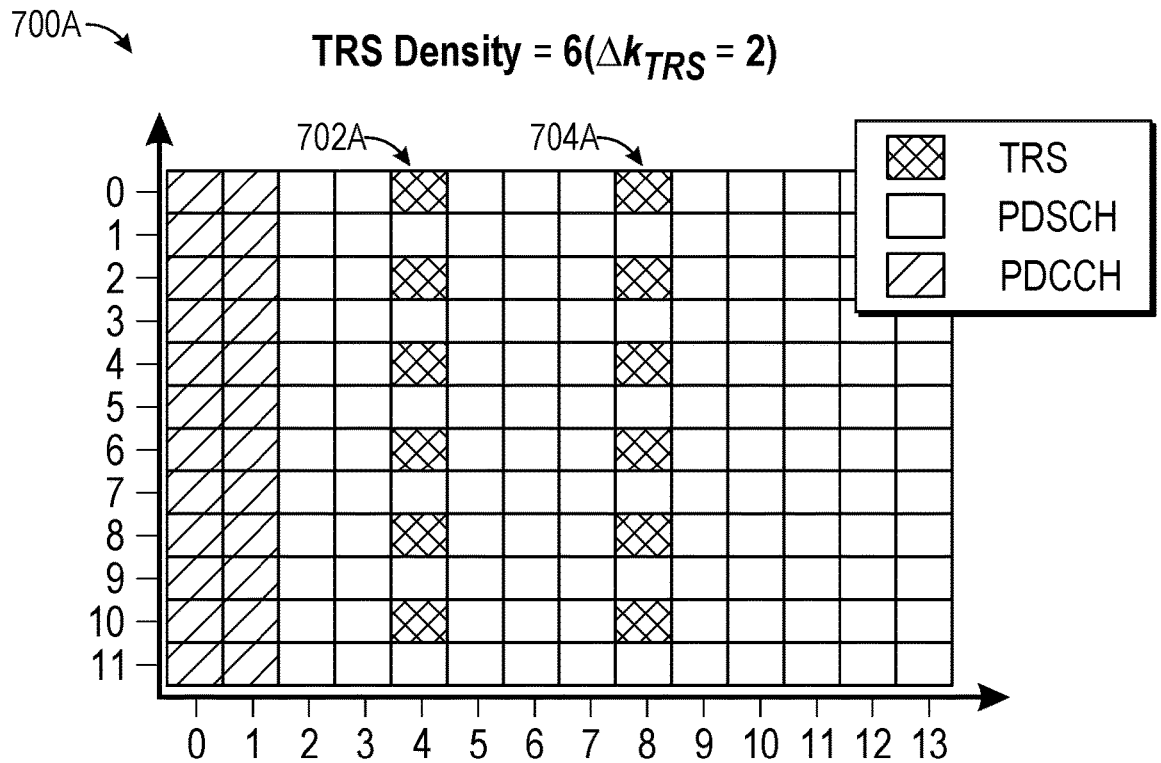
FIGS. 7A and 7B illustrate different tracking reference signal densities.

FIG. 7A provides an example time-frequency resource grid 700A, illustrating a TRS subcarrier spacing of two subcarriers ($\Delta k_{TRS}=2$) or a TRS density of six REs per RB. The time-frequency resource grid 700A may represent one resource block, having 12 subcarriers and 14 symbols. As illustrated, a first TRS 702A may be transmitted in symbol 4 of the time-frequency resource grid 700A while a second TRS 704A may be transmitted in symbol 8 of the time-frequency resource grid 700A. Both of the first TRS 702A and second TRS 704A may have a density of six REs and a TRS subcarrier spacing of two subcarriers measured from the center of TRS REs. As a result, the REs of each of the first TRS 702A and second TRS 704A may alternate every other subcarrier of the resource block in the time-frequency resource grid 700A starting from subcarrier zero, as shown.

Figure 7B:
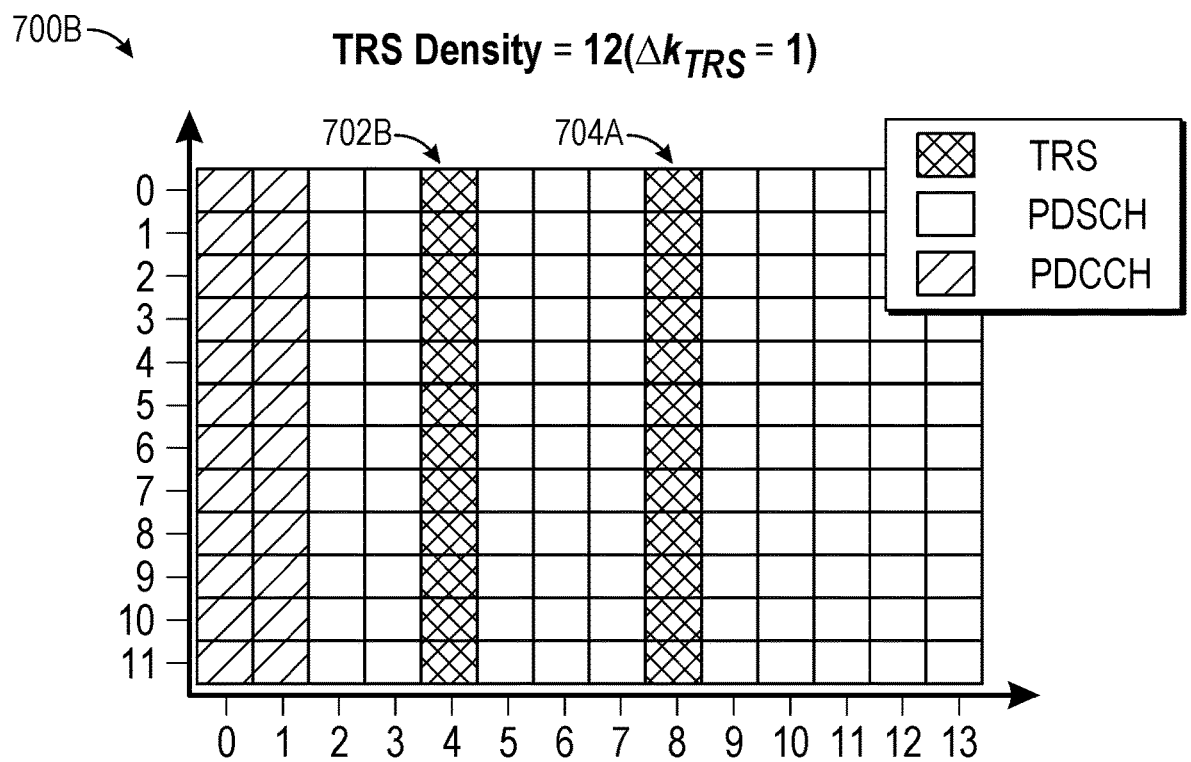

FIG. 7B provides an example time-frequency resource grid 700B, illustrating a TRS subcarrier spacing of two subcarriers ($\Delta k_{TRS}=1$) or a TRS density of 12 REs per TRS. The time-frequency resource grid 700B may represent one resource block, having 12 subcarriers and 14 symbols. As illustrated, a first TRS 702B may be transmitted in symbol 4 of the time-frequency resource grid 700B while a second TRS 704B may be transmitted in symbol 8 of the time-frequency resource grid 700B. Both of the first TRS 702B and second TRS 704B may have a density of 12 REs and a TRS subcarrier spacing between REs of one subcarrier. As a result, the REs of each of the first TRS 702B and second TRS 704B may occupy all subcarriers of the resource block in the time-frequency resource grid 700B, as shown.

Returning to FIG. 6, after determining the variable TRS density, at 608, the BS 602 transmits a configuration indicating a value for the determined variable TRS density, which is received by the UE 604. In some cases, the value of the variable TRS density is indicated in terms of at least one of subcarrier spacing between TRSs (e.g., TRS REs) in an RB or a number of the TRS subcarriers within the RB (e.g., number of TRS REs).

Further, in some cases, the BS 602 may transmit the configuration indicating the value for the variable TRS density via at least one of system information (SI) or radio resource control (RRC) signaling. Additionally, the BS 602 may also provide an indication of the PDSCH SCS to the UE 604 with the configuration that indicates the value for the variable TRS density.

Thereafter, as illustrated at 610 in FIG. 6, the BS 602 transmits TRSs according to the indicated value for the variable TRS density. Further, as illustrated at 612, the UE 604 monitors for the TRSs transmitted by the BS 602 according to the indicated value for the variable TRS density. Thereafter, at 614, the UE 604 performs at least one of frequency tracking or timing tracking based on the monitoring to correct for at least one of a frequency error or a timing error, respectively.

Additional Details Regarding Variable TRS Density Determination and Signaling

As noted above, at 606 in FIG. 6, the BS 602 determines the variable TRS density based, at least in part, on a ratio between the SSB SCS and the PDSCH SCS. In some cases, such determination may be based on a lookup table based on the ratio. For example, the lookup table includes direct mappings between different ratios and different values for TRS densities. Accordingly, in some cases, the BS 602 may determine the ratio between the SSB SCS and the PDSCH SCS and use the ratio to determine the value for the variable TRS density within the lookup table that maps to the ratio. In some cases, the lookup table may be generated by the BS 602 based on Equation 7, above, using different ratios of SSB SCS to PDSCH SCS as inputs.

In some cases, the lookup table may also be generated by the UE 604. In other cases, the BS 602 may transmit the lookup table to the UE 604 or the lookup table could be pre-configured in the UE 604. In either case, the lookup table may be used by the UE 604 to determine the variable TRS density. For example, in some cases, the configuration indicating the value for the variable TRS may include an explicit or direct indication of the variable TRS density. However, in other cases, the configuration indicating the value for the variable TRS may include information that may be used by the UE 604 as an index to determine the variable TRS density from the lookup table. For example, the information that may be used by the UE 604 as an index may include an indication of the ratio between the SSB SCS and PDSCH SCS. In other cases, the information may simply include an indication of at least one of the SSB SCS or PDSCH SCS that the UE 604 uses to determine the ratio which then is used to determine the variable TRS density from the lookup table.

In some cases, the BS 602 may determine the variable TRS density in block 606 based on an indication of a recommended TRS from the UE 604. For example, the BS 602 may transmit an indication of the PDSCH SCS, which may be received by the UE 604. In some cases, the UE 604 may use the PDSCH SCS to determine a particular TRS density that it desires from the BS 602. In some cases, the TRS density determined by the UE 604 may be further based on a particular timing error or SNR experienced by the UE 604.

Thereafter, as illustrated at 605 in FIG. 6, the UE 604 transmits an indication of a recommended TRS density based, at least in part, on the indication of the PDSCH SCS, which may be received by the BS 602. In some cases, the indication of the recommended TRS density may be transmitted by the UE 604 to the BS 602 in a RACH message, such as message 3 (MSG 3) or message A (MSG A) of a RACH procedure between the BS 602 and UE 604. Accordingly, after receiving the indication of the recommended TRS density from the UE 604, the BS 602 may consider the recommended TRS density when configuring the variable TRS density for the UE 604 in block 606 of FIG. 6. For example, in some cases, the BS 602 may determine the variable TRS density in block 606 based, at least in part, on the recommended TRS density.

In some cases, the indication of the recommended TRS density may be transmitted by the UE 604 to the BS 602 in RRC signaling, for example, when the UE 604 already has an established connection with the BS 602. In such cases, the indication of the recommended TRS density may comprise a request to increase or decrease a current TRS density based on certain implementations such as a timing error correction algorithm implemented in the UE 604. For example, the timing pull-in range in Equations (1) and (2) represents the maximum timing error correction that any algorithm can achieve. However, the actual timing correction will depend on the algorithm implemented at the UE 604 and may vary from one UE to another. Accordingly, the BS 602 may consider the request when configuring the variable TRS density for the UE 604. For example, in some cases, the BS 602 may determine the variable TRS density in block 606 based, at least in part, on the request.

Additional Considerations Regarding TRS and Frequency Errors

While the techniques described above for determining a variable TRS density are related to correcting timing errors, similar techniques for a variable TRS density may be used for correcting frequency errors. Frequency errors may originate from a mismatch between a carrier frequency used at the UE 604 and a carrier frequency used at the BS 602. As with timing errors, frequency errors between the UE 604 and the BS 602 should be minimized—otherwise, any transmissions between the BS 602 and the UE 604 may not be received correctly. In some cases, such frequency errors at the UE 604 may occur when the SSB SCS is greater than the PDSCH SCS. In such cases, the frequency error after SSB correction may be larger than a "frequency" pull-in range of the TRS.

In such scenarios, a different symbol spacing within a slot may be used for TRS depending on the ratio between the SSB SCS and the PDSCH SCS. For example, TRSs typically have a symbol spacing of four ($\Delta n_{TRS}=4$), as shown in the example of FIG. 4. However, to account for certain frequency errors that may not be within the frequency pull-in range of TRS when the SSB SCS is greater than the PDSCH SCS, a lower symbol spacing, such as $\Delta n_{TRS}=1$ or $\Delta n_{TRS}=2$, may be used to help increase the frequency pull-in range of the TRS, allowing the UE 604 to use the (more-closely-spaced) TRS to correct for the frequency error. Accordingly, in such cases, the variable TRS density determined by the BS 602 in block 606 of FIG. 6 may be indicated in terms of a symbol spacing between TRS within a slot or a number of the TRS symbols within the slot., for example, (e.g., as opposed to being indicated in terms of least one of a subcarrier spacing between TRS in an RB or a number of TRS subcarriers within the RB for timing error correction).

Figure 8A:
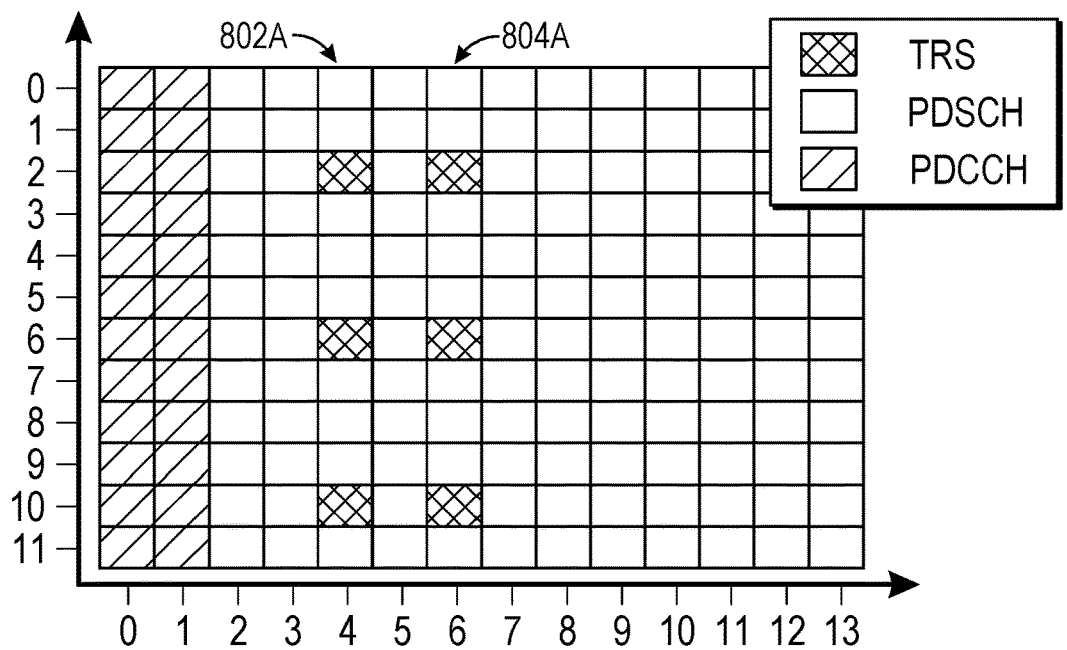
FIGS. 8A and 8B also illustrate different tracking reference signal densities.

FIG. 8A provides an example time-frequency resource grid 800A, illustrating a TRS symbol spacing of two symbols ($\Delta n_{TRS}=2$) measured from the center of the TRS symbols. The time-frequency resource grid 800A may represent one resource block, having 12 subcarriers and 14 symbols. As illustrated, a first TRS 802A is transmitted in symbol 4 of the time-frequency resource grid 800A and a second TRS 804A is transmitted in symbol 6 of the time-frequency resource grid 800A. Accordingly, as shown, the symbol spacing between the first TRS 802A and the second TRS 804A is two symbols, which may increase the frequency pull-in range associated with the TRSs (e.g., as compared to FIG. 4) and allow the UE 604 in FIG. 6 to better correct for frequency errors.

Figure 8B:
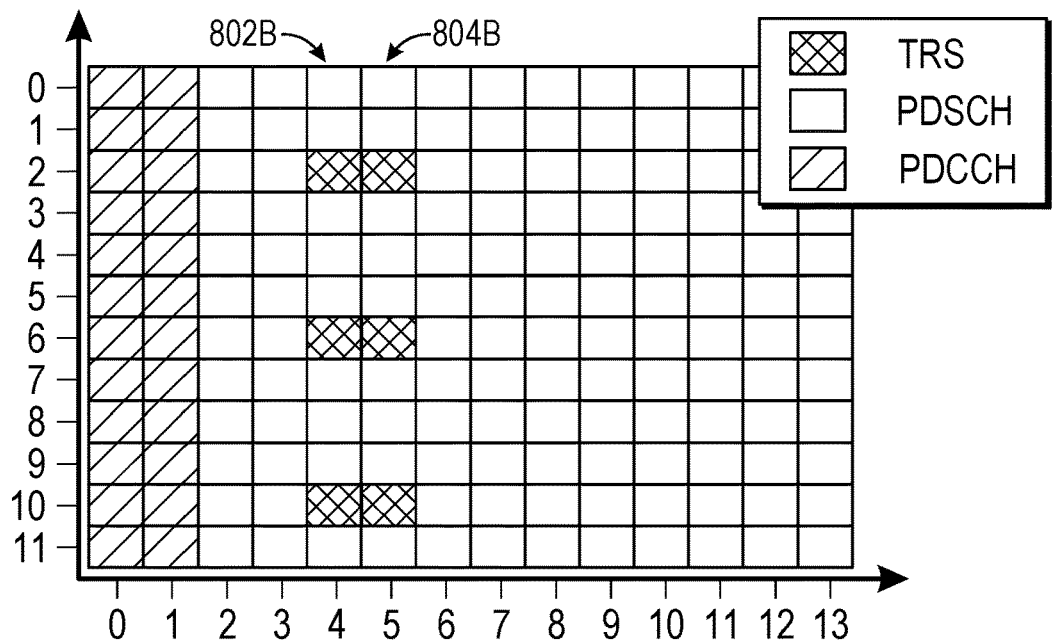

FIG. 8B provides an example time-frequency resource grid 800B, illustrating a TRS symbol spacing of one symbol ($\Delta n_{TRS}=1$). As illustrated, a first TRS 802B is transmitted in symbol 4 of the time-frequency resource grid 800B and a second TRS 804B is transmitted in symbol 5 of the time-frequency resource grid 800B. Accordingly, as shown, the symbol spacing between the first TRS 802B and the second TRS 804B may be one symbol, which may increase the frequency pull-in range associated with the TRSs (e.g., as compared to FIGS. 5 and 8A) and allow the UE 604 in FIG. 6 to better correct for frequency errors.

In some cases, the techniques for reducing timing errors (e.g., by decreasing a TRS subcarrier spacing) and the techniques for reducing frequency errors (e.g., by decreasing a TRS symbol spacing) may be used in combination, resulting in TRSs transmitted with a low subcarrier spacing (e.g., as illustrated in FIG. 7A or 7B) and with a low symbol spacing (e.g., as illustrated in FIG. 8A or 8B).

However, in some cases, such combination may not be necessary. For example, as PDSCH SCS increases, the TRS time pull-in range decreases according to Equation 1. If at the same time, SSB SCS is low (e.g., as compared to the PDSCH SCS), a high SSB sample duration (chip duration) and low SSB granularity occurs, which may increase the timing errors after the SSB. Hence, increasing the TRS density per RB may be used to increase the time pull-in range to better correct for timing errors after SSB correction. However, increasing the PDSCH SCS may reduce the PDSCH symbol time and increase the frequency pull-in range. Thus, TRSs may be able to better handle the frequency errors in such cases.

In some cases, as the PDSCH SCS is decreased (e.g., relative to the SSB SCS), the time pull-in range may be increased, allowing TRSs to better handle timing errors. However, as a result, the frequency pull-in range may be reduced. Thus, in such cases, the symbol spacing $\Delta n_{TRS}$ may be reduced to increase the frequency pull-in range to better handle frequency errors.

Modulation and Coding Scheme Considerations Regarding Variable TRS Density

In some cases, higher modulation and coding schemes (MCS) and modulation orders used for communication between the BS 602 and UE 604 of FIG. 6 may be more sensitive to timing and frequency synchronization errors. Such timing and frequency errors may be especially troublesome for downlink transmissions from the BS 602 that occur prior to reception of TRS by the UE 604 (e.g., such as one or more RACH messages) as these downlink transmissions may not have the benefit of the added timing and/or frequency error correction provided by TRS. As a result, if the MCS or modulation order associated with these downlink transmissions is too high, these downlink transmissions may experience timing and frequency errors at the UE 604, preventing the UE 604 from receiving these downlink transmissions.

For example, 5G NR supports only QPSK modulation for certain downlink transmissions, such as remaining system information (RMSI) transmissions, message 2 (MSG 2) of RACH procedures, and paging PDSCH transmissions. However, QPSK modulation is not mandated for other downlink transmissions, such as message B (MSG B) and message 4 (MSG 4) of a RACH procedure. Thus, these other downlink transmission (e.g., MSG B and MSG 4) may be susceptible to the timing and frequency errors due to higher MCS and/or modulation order.

Accordingly, to reduce the chances of such timing and frequency synchronization errors due to higher MCS and modulation orders, the BS 602 may limit at least one of a modulation order or MCS (e.g., may limit to quadrature phase shift keying (QPSK)) for downlink transmissions (e.g., such as MSG B and MSG 4) to the UE 604 prior to transmitting the configuration (e.g., indicating the value for the variable TRS density) and the TRSs to the UE 604. In some cases, the BS 602 may determine whether to limit at least one of a modulation order or MCS based on the ratio between the SCS of the SSB and the SCS of the downlink transmissions.

For example, in some cases, when the PDSCH SCS is greater than the SSB SCS, lower MCSs and/or modulation orders may be used for the downlink transmissions as compared to the case when the SSB SCS is greater than or equal to the PDSCH SCS. More specifically, if the $SCS_{PDSCH} > SCS_{SSB}$, the BS 602 may limit at least one of the MCS or modulation order of the downlink transmissions to lower MCS or modulation orders, such as QPSK. In some cases, these downlink transmissions may include one or more RACH messages, such as MSG B and MSG 4 (e.g., which are not mandated to be QPSK). However, if the $SCS_{PDSCH} \leq SCS_{SSB}$, higher MCSs and modulation orders may be used for the downlink transmitted before the transmission of the TRS, such as 16-QAM or higher.

Example Operations of a User Equipment

Figure 9:
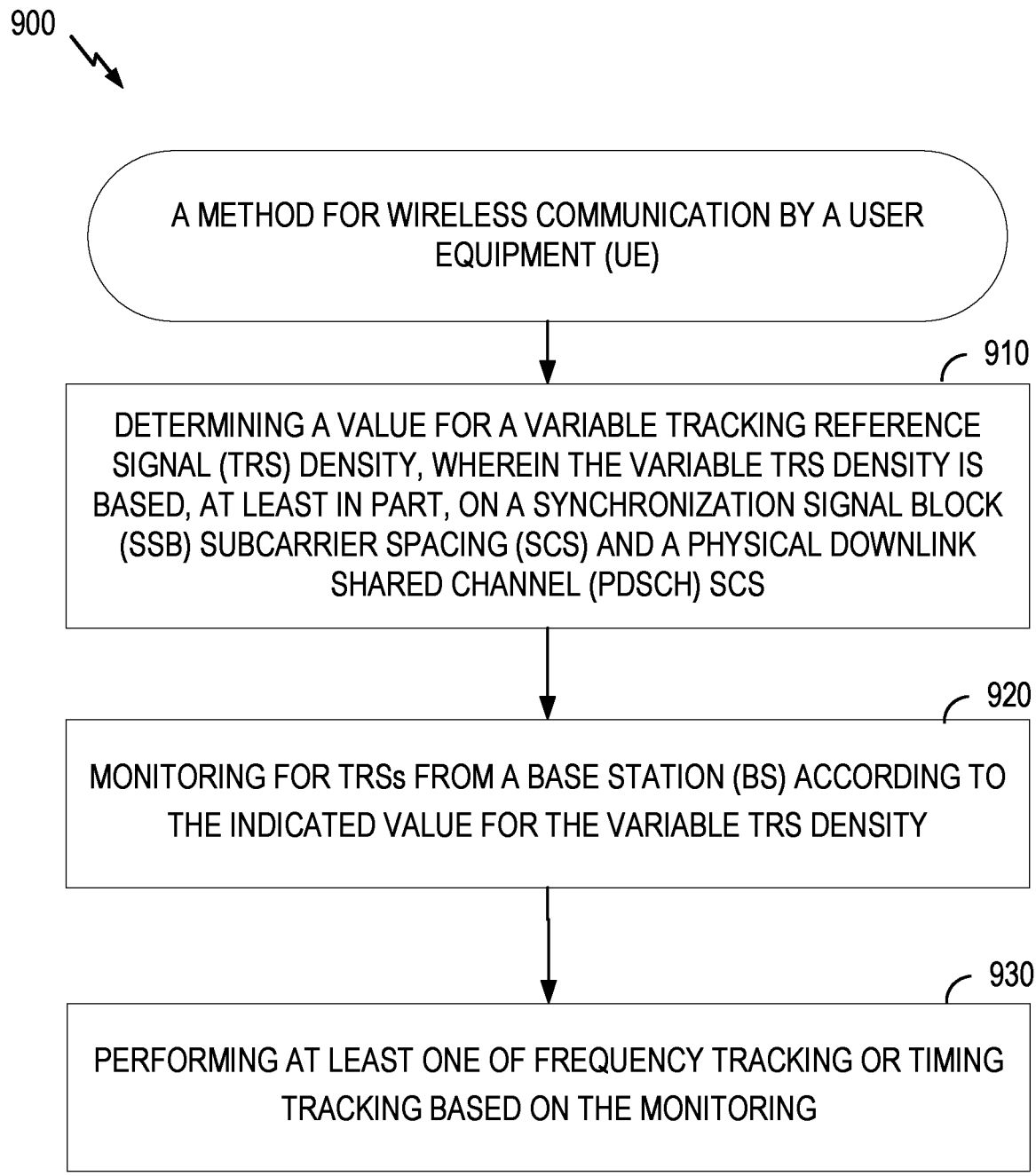
FIG. 9 depicts a method for wireless communication.

FIG. 9 shows a method 900 for wireless communication by a UE, such as UE 104 of FIGS. 1 and 3.

Method 900 begins at 910 with determining a configuration indicating a value for a variable tracking reference signal (TRS) density, wherein the variable TRS density is based, at least in part, on a synchronization signal block (SSB) subcarrier spacing (SCS) and a physical downlink shared channel (PDSCH) SCS.

In block 920, the UE monitors for TRSs from a base station (BS) according to the indicated value for the variable TRS density.

In block 930, the UE performs at least one of frequency tracking or timing tracking based on the monitoring, for example, to correct for at least one of a frequency error or a timing error, respectively.

In some cases, the variable TRS density is based, at least in part, on a synchronization signal block (SSB) subcarrier spacing (SCS) and a physical downlink shared channel (PDSCH) SCS.

In some cases, the variable TRS density is based on a ratio between the SSB SCS and PDSCH SCS.

In some cases, the method 900 may further include determining the variable TRS density from a lookup table using the ratio.

In some cases, determining the configuration indicating the value for the variable TRS density comprises receiving the configuration indicating the value for the variable TRS density from the BS.

In some cases, receiving the configuration indicating the value for the variable TRS density comprises receiving the configuration indicating the value for the variable TRS density via at least one of system information (SI) or radio resource control (RRC) signaling.

In some cases, the method 900 may further include receiving an indication of the PDSCH SCS from the BS with the configuration indicating the value for the variable TRS density.

In some cases, the method 900 may further include receiving an indication of the PDSCH SCS from the BS and transmitting an indication of a recommended TRS density to the BS based, at least in part, on the indication of the PDSCH SCS received from the BS. In some cases, the indication of the recommended TRS density is transmitted to the BS in a random access channel (RACH) message.

In some cases, the method 900 may further include transmitting a request to the BS to increase or decrease the variable TRS density. In some cases, the request to increase or decrease the variable TRS density is transmitted in RRC signaling to the BS.

In some cases, the value of the variable TRS density is indicated in terms of at least one of a subcarrier spacing between TRS in a resource block (RB) and a number of the TRS transmissions within the resource block.

In some cases, the variable TRS density is indicated in terms of a symbol spacing between TRS within a slot.

Figure 11:
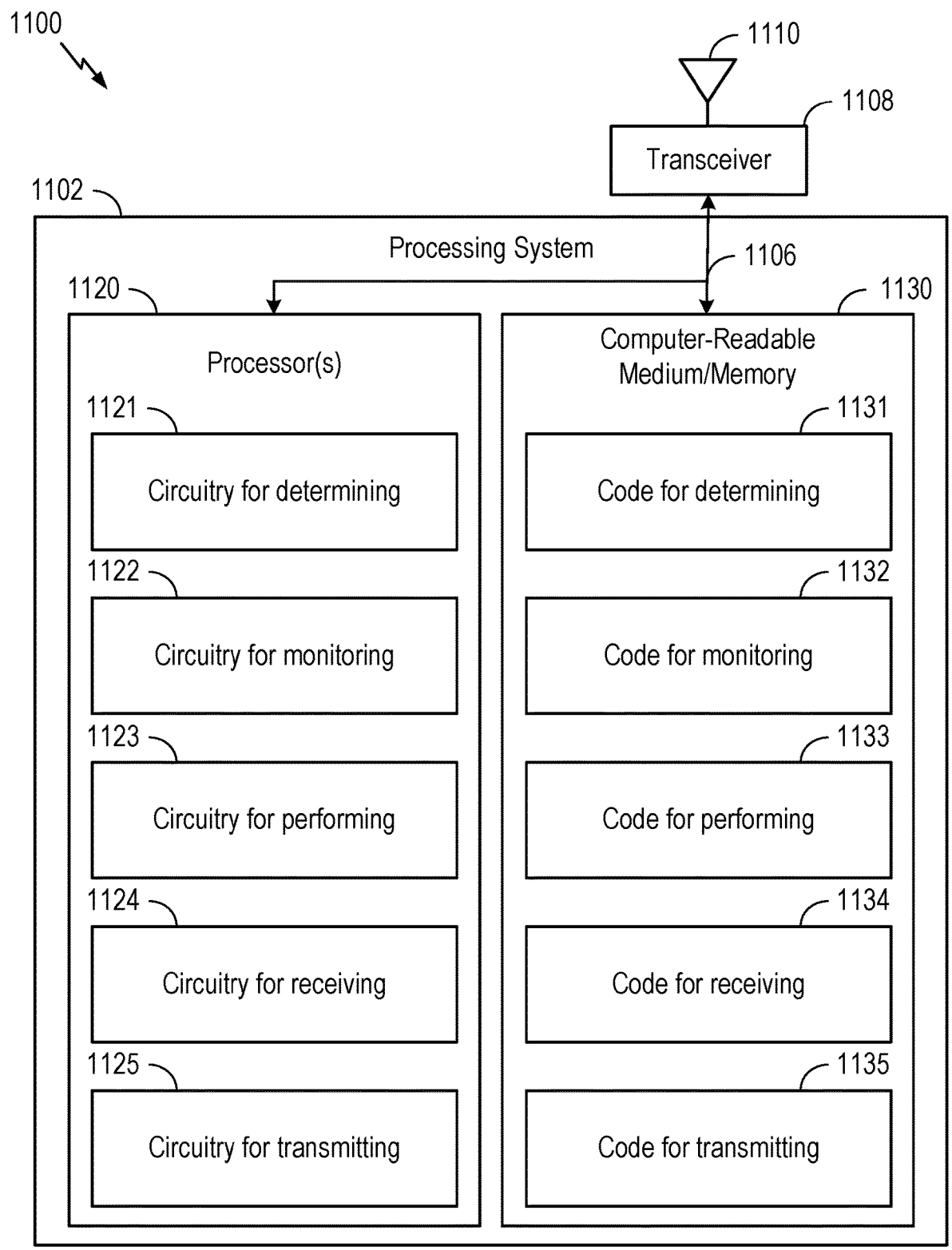
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Operations of a Base Station

FIG. 10 shows a method 1000 for wireless communication by a network entity, such as BS 102 of FIGS. 1 and 3, or a disaggregated base station as discussed with respect to FIG. 2.

Method 1000 begins at 1010 with the BS transmitting a configuration to a user equipment (UE) indicating a value for a variable tracking reference signal (TRS) density, wherein the variable TRS density is based, at least in part, on a synchronization signal block (SSB) subcarrier spacing (SCS) and a physical downlink shared channel (PDSCH) SCS.

At block 1020, the BS transmits TRSs according to the indicated value for the variable TRS density.

In some cases, method 1000 may further include determining the variable TRS density based on a ratio between the SSB SCS and PDSCH SCS. In some cases, method 1000 may further include determining the variable TRS density from a lookup table using the ratio.

In some cases, transmitting the configuration indicating the value for the variable TRS density in block 1010 may include transmitting the configuration indicating the value for the variable TRS density via at least one of system information (SI) or radio resource control (RRC) signaling.

In some cases, method 1000 may further include providing an indication of the PDSCH SCS to the UE with the configuration indicating the value for the variable TRS density.

In some cases, method 1000 may further include transmitting an indication of the PDSCH SCS to the UE, receiving an indication of a recommended TRS density from the UE based, at least in part, on the indication of the PDSCH SCS transmitted to the UE, and determining the variable TRS density for the UE based, at least in part, on the recommended TRS density. In some cases, the indication of the recommended TRS density is received from the UE in a random access channel (RACH) message.

In some cases, method 1000 may further include receiving a request from the UE to increase or decrease the variable TRS density and determining the variable TRS density for the UE based, at least in part, on the request. In some cases, the request to increase or decrease the variable TRS density is received in RRC signaling from the UE.

In some cases, method 1000 may further include limiting at least one of a modulation order or modulation and coding scheme (MCS) for downlink transmissions prior to transmitting the configuration to the UE. In some cases, the limiting is based on a ratio between an SSB SCS and a PDSCH SCS. In some cases, when the PDSCH SCS is greater than the SSB SCS, at least one of the modulation order or the MCS for the downlink transmissions comprises a lower modulation order or MCS for the downlink transmissions relative to when the SSB SCS is greater than or equal to the PDSCH SCS. Further, in some cases, the downlink transmissions comprise of RACH messages such as MSG B and MSG 4 as well as the remaining system information (RMSI) transmissions.

In some cases, the value of the variable TRS density is indicated in terms of at least one of a subcarrier spacing between TRSs (e.g., TRS REs) in a resource block (RB) or a number of TRS subcarriers (e.g., TRS REs) within the resource block. Additionally, in some cases, the variable TRS density is indicated in terms of a symbol spacing between TRSs within a slot or a number of TRS symbols within a slot.

Figure 12:
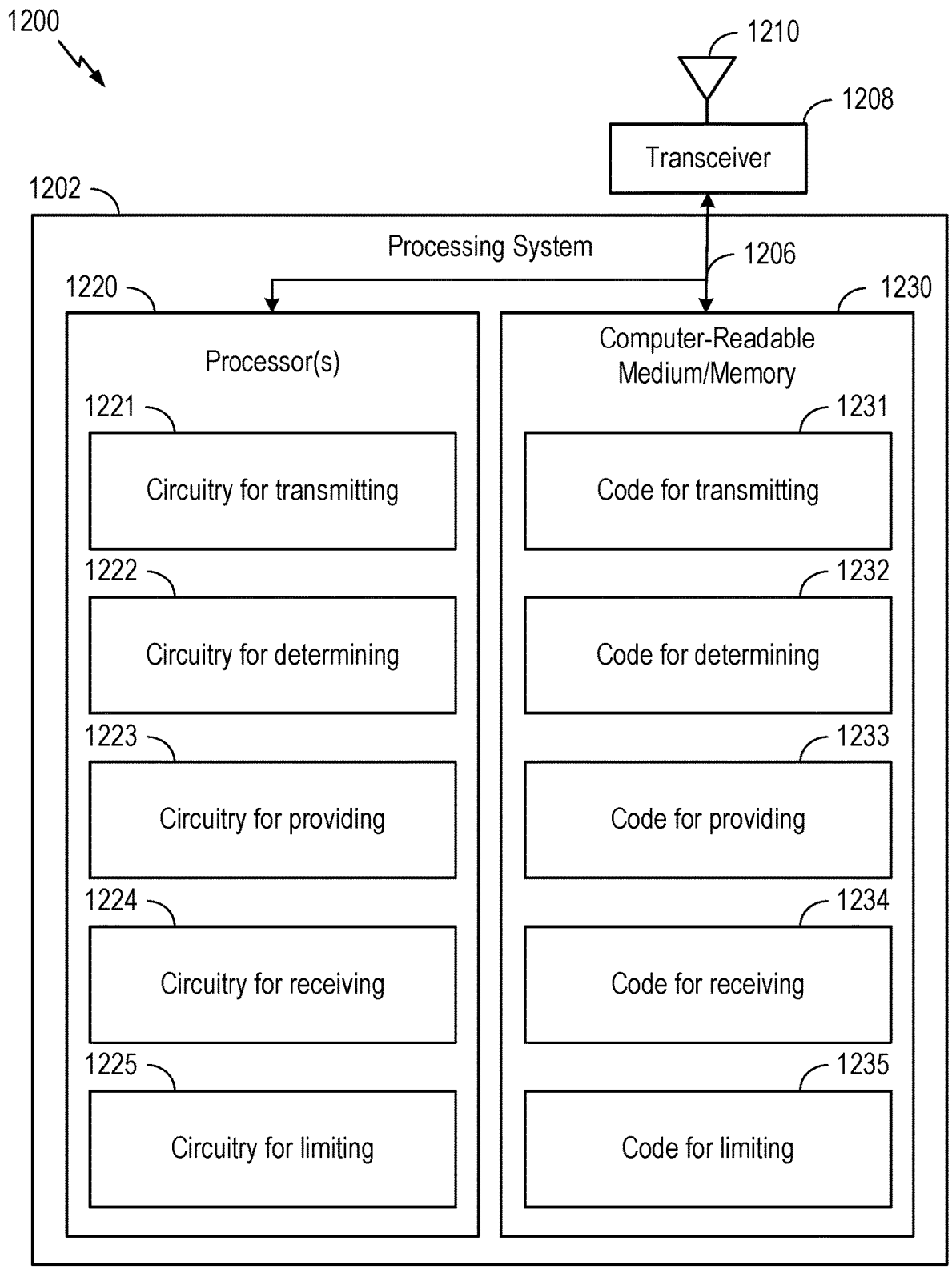
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Example Communication Devices

FIG. 11 depicts aspects of an example communications device 1100. In some aspects, communications device 1100 is a user equipment, such as UE 104 described above with respect to FIGS. 1 and 3.

The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes one or more processors 1120. In various aspects, the one or more processors 1120 may be representative of one or more of receive processor 358, transmit processor 364, TX MIMO processor 366, and/or controller/processor 380, as described with respect to FIG. 3. The one or more processors 1120 are coupled to a computer-readable medium/memory 1130 via a bus 1106. In certain aspects, the computer-readable medium/memory 1130 is configured to store instructions (e.g., computer-executable code) that when executed by the one or more processors 1120, cause the one or more processors 1120 to perform the method 900 described with respect to FIG. 9, or any aspect related to it. Note that reference to a processor performing a function of communications device 1100 may include one or more processors performing that function of communications device 1100.

In the depicted example, computer-readable medium/memory 1130 stores code (e.g., executable instructions) for determining 1131, code for monitoring 1132, code for performing 1133, code for receiving 1134, and code for transmitting 1135. Processing of the code 1131-1135 may cause the communications device 1100 to perform the method 900 described with respect to FIG. 9, or any aspect related to it.

The one or more processors 1120 include circuitry configured to implement (e.g., execute) the code stored in the computer-readable medium/memory 1130, including circuitry for determining 1121, circuitry for monitoring 1122, circuitry for performing 1123, circuitry for receiving 1124, and circuitry for transmitting 1125. Processing with circuitry 1121-1125 may cause the communications device 1100 to perform the method 900 described with respect to FIG. 9, or any aspect related to it.

Various components of the communications device 1100 may provide means for performing the method 900 described with respect to FIG. 9, or any aspect related to it. For example, means for transmitting, sending or outputting for transmission may include the transceivers 354 and/or antenna(s) 352 of the UE 104 illustrated in FIG. 3 and/or transceiver 1108 and antenna 1110 of the communications device 1100 in FIG. 11. Means for receiving or obtaining may include the transceivers 354 and/or antenna(s) 352 of the UE 104 illustrated in FIG. 3 and/or transceiver 1108 and antenna 1110 of the communications device 1100 in FIG. 11. Means for determining, means for monitoring, and means for performing may comprise one or more processors, such as the controller/processor 380, the transmit processor 364, and/or the receive processor 358 of FIG. 3

FIG. 12 depicts aspects of an example communications device.

The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes one or more processors 1220. In various aspects, one or more processors 1220 may be representative of one or more of receive processor 338, transmit processor 320, TX MIMO processor 330, and/or controller/processor 340, as described with respect to FIG. 3. The one or more processors 1220 are coupled to a computer-readable medium/memory 1230 via a bus 1206. In certain aspects, the computer-readable medium/memory 1230 is configured to store instructions (e.g., computer-executable code) that when executed by the one or more processors 1220, cause the one or more processors 1220 to perform the method 1000 described with respect to FIG. 10, or any aspect related to it. Note that reference to a processor of communications device 1200 performing a function may include one or more processors of communications device 1200 performing that function.

In the depicted example, the computer-readable medium/memory 1230 stores code (e.g., executable instructions) for transmitting 1231, code for determining 1232, code for providing 1233, code for receiving 1234, and code for limiting 1235. Processing of the code 1231-1235 may cause the communications device 1200 to perform the method 1000 described with respect to FIG. 10, or any aspect related to it.

The one or more processors 1220 include circuitry configured to implement (e.g., execute) the code stored in the computer-readable medium/memory 1230, including circuitry for transmitting 1221, circuitry for determining 1222, circuitry for providing 1223, circuitry for receiving 1224, and circuitry for limiting 1225. Processing with circuitry 1221-1225 may cause the communications device 1200 to perform the method 1000 as described with respect to FIG. 10, or any aspect related to it.

Various components of the communications device 1200 may provide means for performing the method 1000 as described with respect to FIG. 10, or any aspect related to it. Means for transmitting, sending or outputting for transmission may include the transceivers 332 and/or antenna(s) 334 of the BS 102 illustrated in FIG. 3 and/or transceiver 1208 and antenna 1210 of the communications device 1200 in FIG. 12. Means for receiving or obtaining may include the transceivers 332 and/or antenna(s) 334 of the BS 102 illustrated in FIG. 3 and/or transceiver 1208 and antenna 1210 of the communications device 1200 in FIG. 12. Means for determining, means for taking one or more actions, means for applying, means for dropping, and means for ignoring may comprise one or more processors, such as the controller/processor 340, the transmit processor 320, and/or the receive processor 338 of FIG. 3.

Example Clauses

Implementation examples are described in the following numbered clauses:

Clause 1: A method for wireless communication by a base station (BS), comprising: transmitting a configuration to a user equipment (UE) indicating a value for a variable tracking reference signal (TRS) density, wherein the variable TRS density is based, at least in part, on a synchronization signal block (SSB) subcarrier spacing (SCS) and a physical downlink shared channel (PDSCH) SCS; and transmitting TRSs according to the indicated value for the variable TRS density.

Clause 2: The method of Clause 1, further comprising determining the variable TRS density based on a ratio between the SSB SCS and PDSCH SCS.

Clause 3: The method of Clause 2, further comprising determining the variable TRS density from a lookup table using the ratio.

Clause 4: The method of any one of Clauses 1-3, wherein transmitting the configuration indicating the value for the variable TRS density comprises transmitting the configuration indicating the value for the variable TRS density via at least one of system information (SI) or radio resource control (RRC) signaling.

Clause 5: The method of Clause 4, further comprising providing an indication of the PDSCH SCS to the UE with the configuration indicating the value for the variable TRS density.

Clause 6: The method of any one of Clauses 1-5, further comprising: transmitting an indication of the PDSCH SCS to the UE; receiving an indication of a recommended TRS density from the UE based, at least in part, on the indication of the PDSCH SCS transmitted to the UE; and determining the variable TRS density for the UE based, at least in part, on the recommended TRS density.

Clause 7: The method of Clause 6, wherein the indication of the recommended TRS density is received from the UE in a random access channel (RACH) message.

Clause 8: The method of any one of Clauses 1-7, further comprising: receiving a request from the UE to increase or decrease the variable TRS density; and determining the variable TRS density for the UE based, at least in part, on the request.

Clause 9: The method of Clause 8, wherein the request to increase or decrease the variable TRS density is received in RRC signaling from the UE.

Clause 10: The method of any one of Clauses 1-9, further comprising limiting at least one of a modulation order or modulation and coding scheme (MCS) for downlink transmissions prior to transmitting the configuration to the UE.

Clause 11: The method of Clause 10, wherein the limiting is based on a ratio between an SSB SCS and a PDSCH SCS Clause 12: The method of any one of Clauses 10-11, wherein, when the PDSCH SCS is greater than the SSB SCS, at least one of the modulation order or the MCS for the downlink transmissions comprises a lower modulation order or MCS for the downlink transmissions relative to when the SSB SCS is greater than or equal to the PDSCH SCS.

Clause 13: The method of any one of Clauses 10-12, wherein the downlink transmissions comprise at least one of remaining system information (RMSI) or random access channel (RACH) transmissions.

Clause 14: The method of any one of Clauses 1-13, wherein the value of the variable TRS density is indicated in terms of at least one of a subcarrier spacing between TRSs in a resource block (RB) or a number of TRS subcarriers within the resource block.

Clause 15: The method of any one of Clauses 1-13, wherein the value of the variable TRS density is indicated in terms of at least one of a symbol spacing between TRSs within a slot or a number of TRS symbols within a slot.

Clause 16: A method for wireless communication by a user equipment (UE), comprising: determining a configuration indicating a value for a variable tracking reference signal (TRS) density, wherein the variable TRS density is based, at least in part, on a synchronization signal block (SSB) subcarrier spacing (SCS) and a physical downlink shared channel (PDSCH) SCS; monitoring for TRSs from a base station (BS) according to the indicated value for the variable TRS density; and performing at least one of frequency tracking or timing tracking based on the monitoring.

Clause 17: The method of Clause 16, wherein the variable TRS density is based on a ratio between the SSB SCS and PDSCH SCS.

Clause 18: The method of Clause 17, further comprising determining the variable TRS density from a lookup table using the ratio.

Clause 19: The method of any one of Clauses 16-18, wherein determining the configuration indicating the value for the variable TRS density comprises receiving the configuration indicating the value for the variable TRS density from the BS.

Clause 20: The method of Clause 19, wherein receiving the configuration indicating the value for the variable TRS density comprises receiving the configuration indicating the value for the variable TRS density via at least one of system information (SI) or radio resource control (RRC) signaling.

Clause 21: The method of Clause 20, further comprising receiving an indication of the PDSCH SCS from the BS with the configuration indicating the value for the variable TRS density.

Clause 22: The method of any one of Clauses 16-21, further comprising: receiving an indication of the PDSCH SCS from the BS; and transmitting an indication of a recommended TRS density to the BS based, at least in part, on the indication of the PDSCH SCS received from the BS.

Clause 23: The method of Clause 22, wherein the indication of the recommended TRS density is transmitted to the BS in a random access channel (RACH) message.

Clause 24: The method of any one of Clauses 16-23, further comprising transmitting a request to the BS to increase or decrease the variable TRS density.

Clause 25: The method of Clause 24, wherein the request to increase or decrease the variable TRS density is transmitted in RRC signaling to the BS.

Clause 26: The method of any one of Clauses 16-26, wherein the value of the variable TRS density is indicated in terms of at least one of a subcarrier spacing between TRSs in a resource block (RB) or a number of TRS subcarriers within the resource block.

Clause 27: The method of any one of Clauses 16-26, wherein the value of the variable TRS density is indicated in terms of at least one of a symbol spacing between TRSs within a slot or a number of TRS symbols within a slot.

Clause 28: An apparatus, comprising: a memory comprising executable instructions; and a processor configured to execute the executable instructions and cause the apparatus to perform a method in accordance with any one of Clauses 1-27.

Clause 29: An apparatus, comprising means for performing a method in accordance with any one of Clauses 1-27.

Clause 30: A non-transitory computer-readable medium comprising executable instructions that, when executed by a processor of an apparatus, cause the apparatus to perform a method in accordance with any one of Clauses 1-27.

Clause 31: A computer program product embodied on a computer-readable storage medium comprising code for performing a method in accordance with any one of Clauses 1-27.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus, comprising one or more memories comprising executable instructions, and one or more processors configured to execute the executable instructions and cause the apparatus to:
   transmit a configuration to a user equipment (UE) indicating a value for a variable tracking reference signal (TRS) density, wherein the variable TRS density is based, at least in part, on a synchronization signal block (SSB) subcarrier spacing (SCS) and a physical downlink shared channel (PDSCH) SCS; and
   transmit TRSs according to the indicated value for the variable TRS density,
   wherein the variable TRS density is determined based on a ratio between the SSB SCS and the PDSCH SCS.

2. The apparatus of claim 1, wherein the one or more processors are configured to execute the executable instructions and cause the apparatus to determine the variable TRS density from a lookup table using the ratio.

3. The apparatus of claim 1, wherein the one or more processors are configured to execute the executable instructions and cause the apparatus to transmit the configuration indicating the value for the variable TRS density via at least one of system information (SI) or radio resource control (RRC) signaling.

4. The apparatus of claim 3, wherein the one or more processors are configured to execute the executable instructions and cause the apparatus to provide an indication of the PDSCH SCS to the UE with the configuration indicating the value for the variable TRS density.

5. The apparatus of claim 1, wherein the one or more processors are configured to execute the executable instructions and cause the apparatus to:
   transmit an indication of the PDSCH SCS to the UE;
   receive an indication of a recommended TRS density from the UE based, at least in part, on the indication of the PDSCH SCS transmitted to the UE; and
   determine the variable TRS density for the UE based, at least in part, on the recommended TRS density when configuring the variable TRS density for the UE.

6. The apparatus of claim 5, wherein the one or more processors are configured to execute the executable instructions and cause the apparatus to receive the indication of the recommended TRS density from the UE in a random access channel (RACH) message.

7. The apparatus of claim 1, wherein the one or more processors are configured to execute the executable instructions and cause the apparatus to:
   receive a request from the UE to increase or decrease the variable TRS density; and
   determine the variable TRS density for the UE based, at least in part, on the request.

8. The apparatus of claim 7, wherein the one or more processors are configured to execute the executable instructions and cause the apparatus to receive the request to increase or decrease the variable TRS density in RRC signaling from the UE.

9. The apparatus of claim 1, wherein the one or more processors are configured to execute the executable instructions and cause the apparatus to limit at least one of a modulation order or modulation and coding scheme (MCS) for downlink transmissions prior to transmission of the configuration to the UE.

10. The apparatus of claim 9, wherein the downlink transmissions comprise at least one of remaining system information (RMSI) transmissions or random access channel (RACH) transmissions.

11. The apparatus of claim 1, wherein the value of the variable TRS density is indicated in terms of at least one of a subcarrier spacing between TRS in a resource block (RB) or a number of TRS subcarriers within the resource block.

12. The apparatus of claim 1, wherein the value of the variable TRS density is indicated in terms of at least one of a symbol spacing between TRS within a slot or a number of TRS symbols within a slot.

13. An apparatus, comprising one or more memories comprising executable instructions, and one or more processors configured to execute the executable instructions and cause the apparatus to:
   limit at least one of a modulation order or modulation and coding scheme (MCS) for downlink transmissions prior to transmission of a configuration to a user equipment (UE) indicating a value for a variable tracking reference signal (TRS) density;
   transmit the configuration to the UE, wherein the variable TRS density is based, at least in part, on a synchronization signal block (SSB) subcarrier spacing (SCS) and a physical downlink shared channel (PDSCH) SCS; and
   transmit TRSs according to the indicated value for the variable TRS density,
   wherein the one or more processors are configured to execute the executable instructions and cause the apparatus to limit the at least one of the modulation order or modulation and coding scheme (MCS) for downlink transmissions based on a ratio between first SSB SCS and a first PDSCH SCS.

14. An apparatus, comprising one or more memories comprising executable instructions, and one or more processors configured to execute the executable instructions and cause the apparatus to:
   limit at least one of a modulation order or modulation and coding scheme (MCS) for downlink transmissions prior to transmission of a configuration to a user equipment (UE) indicating a value for a variable tracking reference signal (TRS) density;

transmit the configuration to the UE, wherein the variable TRS density is based, at least in part, on a synchronization signal block (SSB) subcarrier spacing (SCS) and a physical downlink shared channel (PDSCH) SCS; and transmit TRSs according to the indicated value for the variable TRS density, wherein, when the PDSCH SCS is greater than the SSB SCS, at least one of the modulation order or the MCS for the downlink transmissions comprises a lower modulation order or MCS for the downlink transmissions relative to when the SSB SCS is greater than or equal to the PDSCH SCS.

15. An apparatus, comprising one or more memories comprising executable instructions, and one or more processors configured to execute the executable instructions and cause the apparatus to:

determine a configuration indicating a value for a variable tracking reference signal (TRS) density, wherein the variable TRS density is based, at least in part, on a synchronization signal block (SSB) subcarrier spacing (SCS) and a physical downlink shared channel (PDSCH) SCS;

monitor for TRSs from a base station (BS) according to the indicated value for the variable TRS density; and perform at least one of frequency tracking or timing tracking based on the monitoring, wherein the variable TRS density is based on a ratio between the SSB SCS and the PDSCH SCS.

16. The apparatus of claim 15, wherein the one or more processors are configured to execute the executable instructions and cause the apparatus to determine the variable TRS density from a lookup table using the ratio.

17. The apparatus of claim 15, wherein to determine the configuration indicating the value for the variable TRS density, the one or more processors are configured to execute the executable instructions and cause the apparatus to receive the configuration indicating the value for the variable TRS density from the BS.

18. The apparatus of claim 17, wherein to receive the configuration indicating the value for the variable TRS density, the one or more processors are configured to execute the executable instructions and cause the apparatus to receive the configuration indicating the value for the variable TRS density via at least one of system information (SI) or radio resource control (RRC) signaling.

19. The apparatus of claim 18, wherein the one or more processors are configured to execute the executable instructions and cause the apparatus to receive an indication of the PDSCH SCS from the BS with the configuration indicating the value for the variable TRS density.

20. The apparatus of claim 15, wherein the one or more processors are configured to execute the executable instructions and cause the apparatus to:

receive an indication of the PDSCH SCS from the BS; and transmit an indication of a recommended TRS density to the BS based, at least in part, on the indication of the PDSCH SCS received from the BS.

21. The apparatus of claim 20, wherein the one or more processors are configured to execute the executable instructions and cause the apparatus to transmit the indication of the recommended TRS density to the BS in a random access channel (RACH) message.

22. The apparatus of claim 15, wherein the one or more processors are configured to execute the executable instructions and cause the apparatus to transmit a request to the BS to increase or decrease the variable TRS density.

23. The apparatus of claim 22, wherein the one or more processors are configured to execute the executable instructions and cause the apparatus to transmit the request to increase or decrease the variable TRS density in RRC signaling to the BS.

24. The apparatus of claim 15, wherein the value of the variable TRS density is indicated in terms of at least one of a subcarrier spacing between TRSs in a resource block (RB) or a number of TRS subcarriers within the resource block.

25. The apparatus of claim 15, wherein the value of the variable TRS density is indicated in terms of at least one of a symbol spacing between TRSs within a slot or a number of TRS symbols within a slot.

\* \* \* \* \*